US010765103B2

(12) United States Patent
Davis

(10) Patent No.: US 10,765,103 B2
(45) Date of Patent: Sep. 8, 2020

(54) SPRAY NOZZLE SYSTEM

(71) Applicant: THE BOARD OF TRUSTEES OF THE UNIVERSITY OF ARKANSAS, Little Rock, AR (US)

(72) Inventor: Jason Allen Davis, Melbourne, AR (US)

(73) Assignee: THE BOARD OF TRUSTEES OF THE UNIVERSITY OF ARKANSAS, Little Rock, AR (US)

(*) Notice: Subject to any disclaimer, the term of this patent is extended or adjusted under 35 U.S.C. 154(b) by 228 days.

(21) Appl. No.: 15/995,450

(22) Filed: Jun. 1, 2018

(65) Prior Publication Data

US 2018/0343849 A1 Dec. 6, 2018

Related U.S. Application Data

(60) Provisional application No. 62/515,221, filed on Jun. 5, 2017.

(51) Int. Cl.
*A01M 7/00* (2006.01)
*B05B 15/65* (2018.01)
*B05B 15/652* (2018.01)
*B64D 1/18* (2006.01)
*B05B 12/36* (2018.01)
*B05B 1/12* (2006.01)

(52) U.S. Cl.
CPC .......... *A01M 7/0064* (2013.01); *A01M 7/006* (2013.01); *A01M 7/0032* (2013.01); *A01M 7/0089* (2013.01); *B05B 12/36* (2018.02); *B05B 15/65* (2018.02); *B05B 15/652* (2018.02); *B64D 1/18* (2013.01); *B05B 1/12* (2013.01)

(58) Field of Classification Search
CPC .. A01M 7/0032; A01M 7/006; A01M 7/0064; A01M 7/0089; B05B 1/12; B05B 12/36; B05B 15/65; B05B 15/652; B64D 1/18
USPC ........................................................ 239/600
See application file for complete search history.

(56) References Cited

U.S. PATENT DOCUMENTS

| 4,114,812 A * | 9/1978 | Austin ................. B05B 9/0426 239/492 |
| 5,190,224 A | 3/1993 | Hamilton |
| 5,199,649 A * | 4/1993 | Tolboll .................. B05B 15/65 239/600 |
| 5,727,739 A | 3/1998 | Hamilton |
| 6,079,638 A * | 6/2000 | Chang ................... A62C 31/02 239/390 |
| 6,244,527 B1 | 6/2001 | Ferrazza et al. |
| 6,398,128 B1 | 6/2002 | Hamilton et al. |

(Continued)

OTHER PUBLICATIONS

TeeJet Technologies, "Catalog 51A," 2014, pp. 1-157, L151A, Springfield, IL, USA.

(Continued)

*Primary Examiner* — Darren W Gorman
(74) *Attorney, Agent, or Firm* — Michael Best & Friedrich LLP

(57) ABSTRACT

A spray nozzle system includes a nozzle body and an adaptor coupled to the nozzle body. The adaptor has a first region and a second region angled at a non-zero angle relative to the first region. The spray nozzle system also includes a nozzle cap coupled to the second region of the adaptor. The nozzle cap includes a nozzle outlet to spray a liquid.

8 Claims, 2 Drawing Sheets

(56) References Cited

U.S. PATENT DOCUMENTS

| | | | | |
|---|---|---|---|---|
| 6,595,439 B1* | 7/2003 | Chen | ................... | B05B 15/68 |
| | | | | 239/225.1 |
| 8,936,207 B2* | 1/2015 | Swan | ................... | B05B 7/0425 |
| | | | | 239/600 |
| 2015/0289443 A1* | 10/2015 | Garuti | ................... | B05B 1/1645 |
| | | | | 239/444 |

OTHER PUBLICATIONS

Website, "Redball-Hooded Sprayers & Spray Hoods," Ag Spray Hood Spayers Willmar Fabrication website, 2014, https://www.willmarfab.com/spray-hoods.php, Willmar Fabrication, LLC, Benson, MN, USA.

* cited by examiner

SPRAY NOZZLE SYSTEM

CROSS-REFERENCE TO RELATED APPLICATIONS

This application is a non-provisional of and claims priority to U.S. Provisional Application No. 62/515,221, filed Jun. 5, 2017, the entire contents of which are incorporated herein by reference.

BACKGROUND OF THE INVENTION

Spray nozzles are commonly used to apply pesticides or herbicides onto targeted areas in an agricultural field. Recent developments in environmental regulations, however, have added pressure to keep the pesticides from drifting onto non-targeted areas.

SUMMARY OF THE INVENTION

In accordance with one embodiment, a spray nozzle system includes a nozzle body, and an adaptor configured to be coupled to the nozzle body. The adaptor has a first region and a second region angled at a non-zero angle relative to the first region. The spray nozzle system also includes a nozzle cap configured to be coupled to the second region of the adaptor. The nozzle cap includes a nozzle outlet to spray a liquid.

In accordance with another embodiment, a spray nozzle system includes an adaptor configured to be coupled to both a nozzle body and to a nozzle cap. The adaptor has a first, main body portion and a second body coupled to the first body portion. The second body portion includes a first region and a second region angled at a non-zero angle relative to the first region. The first, main body portion includes an opening sized and shaped to receive at least a portion of the nozzle body, and the second region is configured to be coupled to the nozzle cap.

Other aspects of the invention will become apparent by consideration of the detailed description and accompanying drawings.

It should be understood that the invention is not limited in its application to the details of construction and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 1:
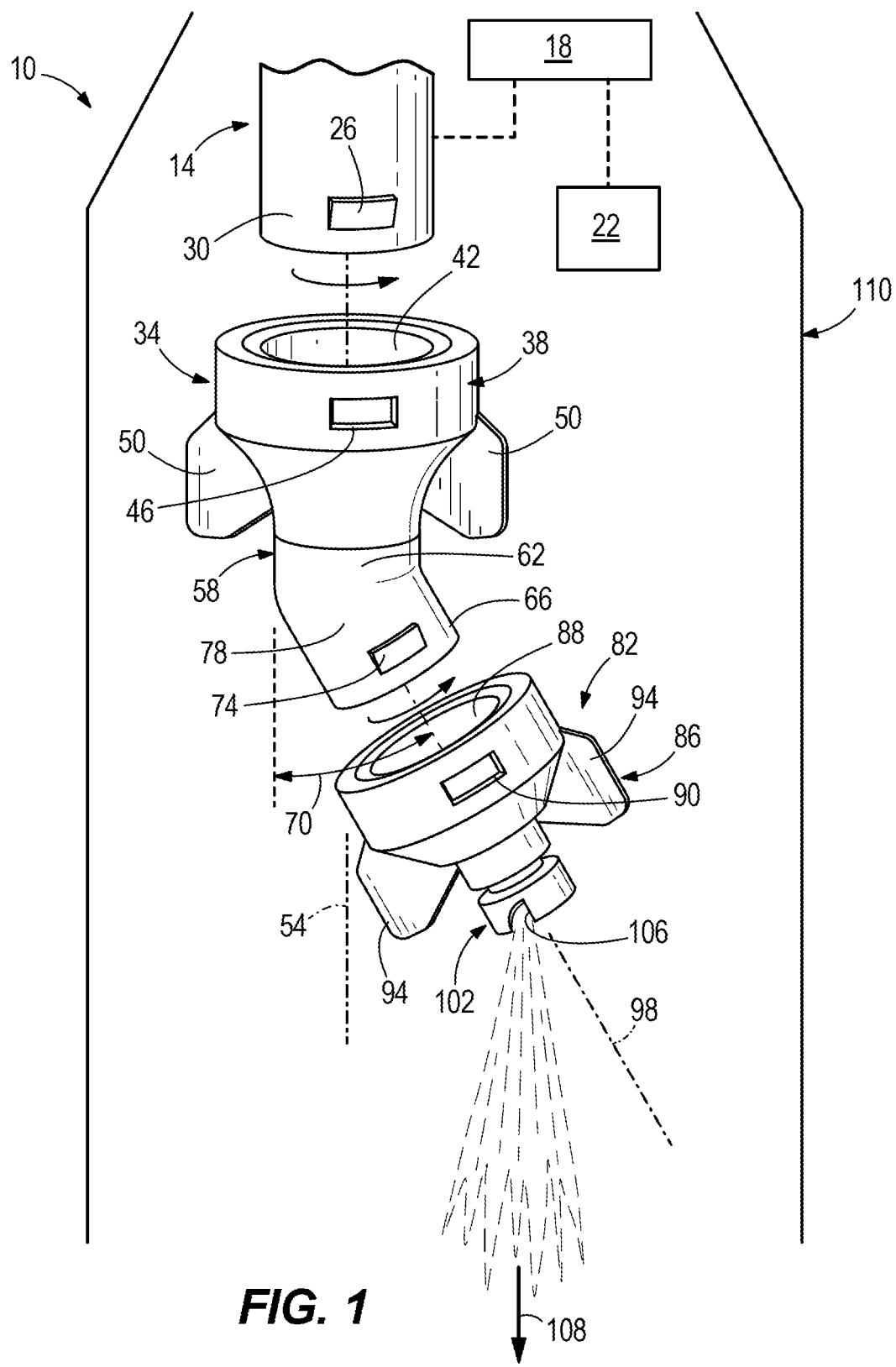
FIG. 1 is a schematic view of a spray nozzle system according to one construction, illustrating a nozzle body, a nozzle adapter, and a first nozzle cap.
Figure 2:
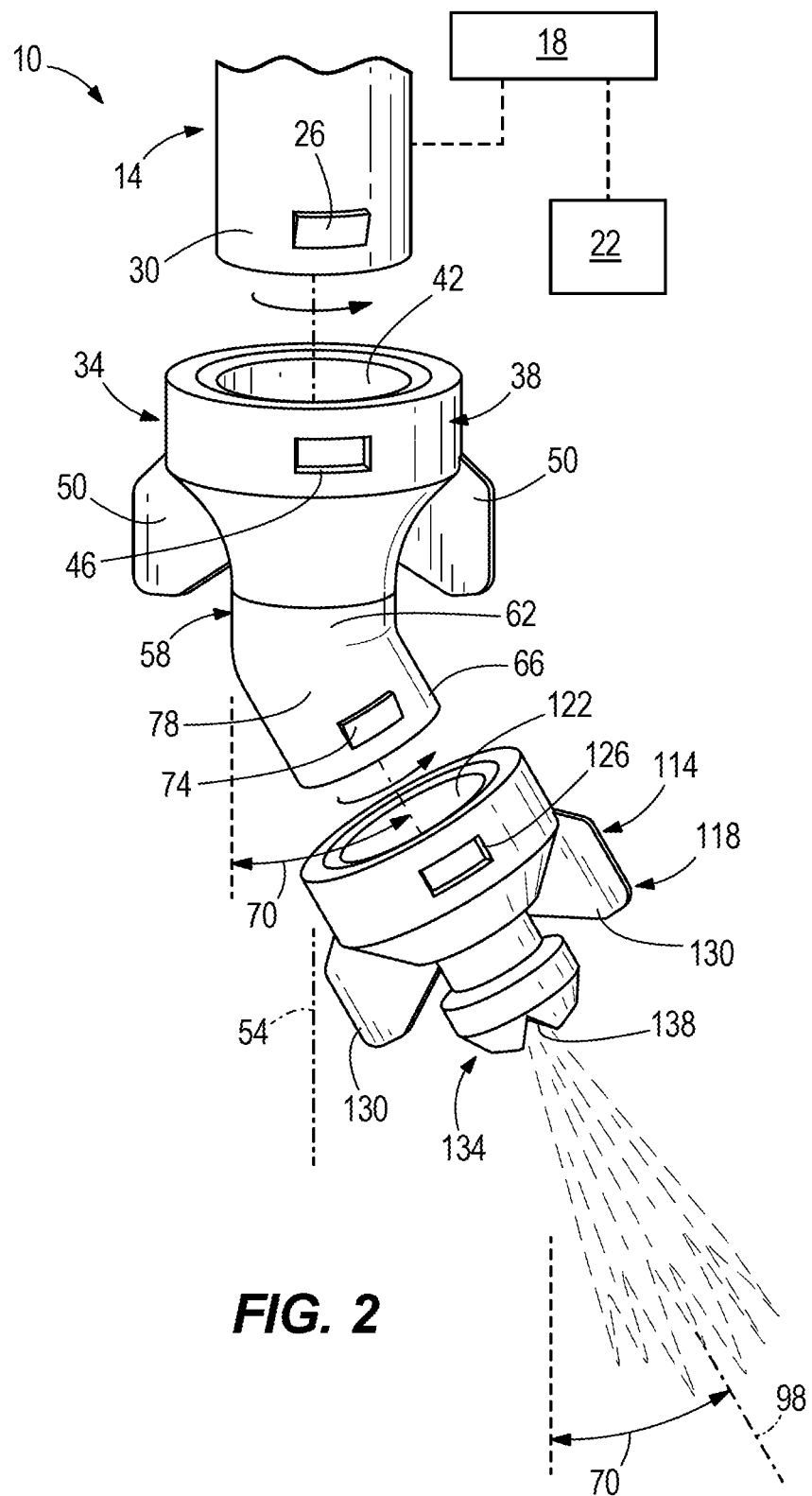
FIG. 2 is a schematic view of the spray nozzle system of FIG. 1, illustrating a second nozzle cap replacing the first nozzle cap.

FIGS. 1 and 2 illustrate a spray nozzle system 10 according to an embodiment of the present invention. In the illustrated construction, the spray nozzle system 10 is configured to spray pesticides or herbicides onto targeted areas (e.g., onto particular areas of plants or crops) in an agricultural field. In other constructions, the spray nozzle system 10 sprays liquids other than pesticides or herbicides (e.g., water, etc.) onto targeted areas. In some constructions, the spray nozzle system 10 sprays pesticides, herbicides, or other liquids onto targeted areas in locations other than an agricultural field (e.g., within a greenhouse environment or other environment where crops or other plants are grown).

The spray nozzle system 10 includes a nozzle body 14. The nozzle body 14 is coupled to a boom 18 of a spraying machine. The boom 18 is coupled to a liquid source 22 (e.g., a reservoir or other source of pesticides or herbicides), such that liquid from the liquid source 22 passes through the boom 18 and into the nozzle body 14. In the illustrated construction, the nozzle body 14 is generally cylindrical, although other constructions include different shapes and sizes than that illustrated. As illustrated in FIGS. 1 and 2, the nozzle body 14 includes at least one nozzle body connector lug 26 along a side 30 of the nozzle body 14. In some constructions, the nozzle body 14 includes two nozzle body connector lugs 26, disposed approximately 180 degrees apart from one another along the side 30 of the nozzle body 14. Other constructions include different numbers and arrangements of nozzle body connector lugs 26.

The spray nozzle system 10 further includes an adaptor 34. The adaptor 34 includes a first, main body portion 38 that defines an opening 42 at an upper end of the adaptor 34. The opening 42 is sized and shaped to receive at least a portion of the nozzle body 14. As illustrated in FIGS. 1 and 2, the first, main body portion 38 includes at least one adaptor connector slot 46, as well as at least one protruding rib 50. The illustrated construction includes a single adaptor connector slot 46 and two protruding ribs 50, although other constructions include different numbers and arrangements than that illustrated. For example, in some constructions no protruding ribs 50 are provided.

To couple the adaptor 34 to the nozzle body 14, the operator may grip one or both of the illustrated protruding ribs 50 and twist the adaptor 34 up onto and over a portion of the nozzle body 14 along an axis 54 (e.g., a vertical axis) until the nozzle body connector lug(s) 26 snaps into the adaptor connector slot(s) 46, thereby fixing a position of the adaptor 34 relative to the nozzle body 14. In some constructions the first, main body portion 38 is flexible adjacent the opening 42, such that a portion or portions of the main body portion 38 snap over the nozzle body connector lug(s) 26.

The positioning of the nozzle body connector lug(s) 26 and the adaptor connector slot(s) 46 may vary. Thus, in some constructions the main body portion 38 of the adaptor 34 may include the connector lugs 26, and the nozzle body 14 may include the connector slots 46. In yet other constructions, a portion or portions of the nozzle body 14 and/or the adaptor 34 are tapered and/or threaded to facilitate coupling of the adaptor 34 to the nozzle body 14. U.S. Pat. No. 5,190,224, the entire contents of which are incorporated herein, describes and illustrates various quick-lock systems and structures for coupling nozzle components together (e.g., camming lugs 40 with camming ramps 44, and camming slots 41). U.S. Pat. No. 5,727,739, the entire contents of which are incorporated herein by reference, also describes quick-lock systems (e.g., with lugs 38 and 40, and slots 42). In some constructions, the nozzle body 14 and/or the adaptor 34 may thus include one or more coupling structures such as those described in U.S. Pat. No. 5,190,224 or U.S. Pat. No. 5,727,739. Various other structures for coupling the adaptor 34 to the nozzle body 14 may also be used.

With continued reference to FIGS. 1 and 2, the adaptor 34 further includes a second body portion 58 that is coupled to (e.g., integrally formed as a single piece with) the first, main body portion 38. In the illustrated construction, the second body portion 58 is a bent or angled tubular structure having a first region 62 that extends along the axis 54 away from the first, main body portion 38 and a second region 66 that extends at a non-zero angle 70 relative to the axis 54 away from the first region 62. In the illustrated construction, the angle 70 is between 5° and 30°. In some constructions, the angle 70 is between 15° and 20°. In some constructions, the angle 70 is less than 5° or greater than 30°. Other constructions include various other ranges and values.

In the illustrated construction, the second body portion 58 includes at least one adaptor connector lug 74 along a side 78 of the second region 66. In some constructions, the nozzle body 14 includes two adaptor connector lugs 74, disposed approximately 180 degrees apart from one another along the side 78 of the second region 66. Other constructions include different numbers and arrangements of adaptor connector lugs 74.

The spray nozzle system 10 further includes at least one nozzle cap 82, 114 sized and shaped to couple to the adaptor 34. For example, and with reference to FIG. 1, a first nozzle cap 82 includes a first, main body portion 86 that defines an opening 88 at an upper end of the nozzle cap 82. The opening 88 is sized and shaped to receive at least a portion of the second region 66 of the adaptor 34. As illustrated in FIG. 1, the first, main body portion 86 of the nozzle cap 82 includes at least one nozzle cap connector slot 90, as well as at least one protruding rib 94. The illustrated construction includes a single nozzle cap connector slot 90 and two protruding ribs 94, although other constructions include different numbers and arrangements. For example, in some constructions no protruding ribs 94 are provided.

To couple the nozzle cap 82 to the adaptor 34, the operator may grip one or both of the illustrated protruding ribs 94 on the nozzle cap 82 and twist the main body portion 86 of the nozzle cap 82 onto and over the second region 66 of the adaptor 34 along an axis 98 until the adaptor connector lug(s) 74 snaps into the nozzle cap connector slot(s) 90, thereby fixing a position of the nozzle cap 82 to the adaptor 34. In some constructions, the first, main body portion 86 of the nozzle cap 82 is flexible adjacent the opening 88, such that a portion or portions of the first, main body portion 86 snap over the adaptor connector lug(s) 74.

The positioning of the adaptor connector lug(s) 74 and the nozzle cap connector slot(s) 90 may vary. Thus, in some constructions the first, main body portion 86 of the nozzle cap 82 includes the connector lug(s) 74 and the second region 66 of the adaptor 34 includes the connector slot(s) 90. In yet other constructions, a portion or portions of the second region 66 and/or the nozzle cap 82 are tapered and/or threaded to facilitate coupling of the second region 66 to the nozzle cap 82. As noted above, U.S. Pat. No. 5,190,224 and U.S. Pat. No. 5,727,739 describe and illustrate various quick-lock systems and structures for coupling nozzle components together. In some constructions, the second region 66 and/or the nozzle cap 82 may thus include one or more coupling structures described in U.S. Pat. No. 5,190,224 or U.S. Pat. No. 5,727,739. Various other structures for coupling the second region 66 to the nozzle cap 82 may also be used.

With continued reference to FIG. 1, the nozzle cap 82 includes a second body portion 102 that is coupled to (e.g., integrally formed as a single piece with) the first, main body portion 86 of the nozzle cap 82. The second body portion 102 includes a nozzle outlet 106 that is angled relative to the axis 98. In the illustrated construction, the nozzle outlet 106 is angled at the same angle 70 that the second region 66 is angled relative to the axis 54, such that liquid (e.g., pesticide or herbicide) exiting the nozzle outlet 106 is directed directly down (i.e., along a direction 108 parallel to that of the axis 54). The adaptor 34 thus allows for use of a nozzle cap 82 with an angled nozzle outlet 106 to be used to direct liquid directly down during a spraying operation. This is particularly useful when, as schematically illustrated in FIG. 1, a hood 110 is provided around the spray nozzle system 10. The hood 110 extends over and surrounds at least a portion of the adaptor 34 and the nozzle cap 82. The hood 110 may be used in what are commonly referred to as "no spray buffer zones" that may be near or adjacent to non-targeted crops, residential areas, and endangered species. The hood 110 prevents liquid spray from reaching areas outside of the hood 110, and thus keeps the spray directed only to weeds or other targeted areas within these "no spray buffer zones." By using the adapter 34 to re-orient the nozzle outlet 106 and direct the spray directly down, the spray does not wash up against the hood 110 or otherwise become impeded by the hood 110 during a spraying operation.

With reference to FIG. 2, a second nozzle cap 114 may alternatively be coupled to the adapter 34. The second nozzle cap 114 includes a first, main body portion 118 that defines an opening 122 at an upper end of the nozzle cap 114. The opening 122 is sized and shaped to receive at least a portion of the second region 66 of the adaptor 34. As illustrated in FIG. 2, the first, main body portion 118 includes at least one nozzle cap connector slot 126, as well as at least one protruding rib 130. The illustrated construction includes a single nozzle cap connector slot 126 and two protruding ribs 130, although other constructions include different numbers and arrangements. For example, in some constructions, no protruding ribs 130 are provided.

To couple the second nozzle cap 114 to the adaptor 34, the operator may grip one or both of the illustrated protruding ribs 130 on the nozzle cap 114 and twist the first, main body portion 118 onto and over the second region 66 of the adaptor 34 along the axis 98 until the adaptor connector lug(s) 74 snaps into the nozzle cap connector slot(s) 126, thereby fixing a position of the nozzle cap 114 to the adaptor 34. In some constructions, the main body portion 118 of the nozzle cap 114 is flexible, such that a portion or portions of the main body portion 118 snap over the adaptor connector lug(s) 74.

The positioning of the connector lug(s) 74 and the nozzle cap connector slot(s) 126 may vary. Thus, in some constructions, the main body portion 118 of the nozzle cap 114 includes the connector lug(s) 74 and the second region 66 of the adaptor 34 includes the connector slot(s) 126. In yet other constructions, a portion or portions of the second region 66 and/or the nozzle cap 114 are tapered and/or threaded to facilitate coupling of the second region 66 to the nozzle cap 114. As noted above, U.S. Pat. No. 5,190,224 and U.S. Pat. No. 5,727,739 describe and illustrate various quick-lock systems and structures for coupling nozzle components together. In some constructions the second region 66 and/or the nozzle cap 114 may thus include one or more coupling structures described in U.S. Pat. No. 5,190,224 or U.S. Pat. No. 5,727,739. Various other structures for coupling the second nozzle cap 114 to the adaptor 34 may also be used.

With continued reference to FIG. 2, the second nozzle cap 114 includes a second body portion 134 that is coupled to (e.g., integrally formed as a single piece with) the first, main body portion 118 of the nozzle cap 114. The second body portion 134 includes a nozzle outlet 138 that extends directly along the axis 98, such that liquid (e.g., pesticides or herbicides) exiting the nozzle outlet 138 is directed along the axis 98. The adaptor 34 thus allows for use of a nozzle cap 114 with an otherwise straight nozzle outlet 138 to be used to direct liquid at an angle 70 that is identical to the angle 70 of the second region 66 relative to the axis 54. This is particularly useful when the hood structure 110 is not provided, and the operator wishes to direct pesticides or herbicides forward and/or backward in relation to the direction of travel of the spray equipment from the nozzle body 14 onto portions of crops or other plants.

With continued reference to FIGS. 1 and 2, while the illustrated constructions illustrate the second region 66 of the adaptor 34 always being angled in the same direction (i.e., to the right in both FIGS. 1 and 2), in some constructions the second portion of the adaptor 34 may be turned 90 degrees, 180 degrees, 270 degrees, or some other angle relative to the angle shown. For example, in some constructions, the adaptor 34 may include multiple lugs and/or slots that mate with corresponding lugs and/or slots on the nozzle body 14, such that the angled second region 66 may be moved and shifted as desired. This movement facilitates directional spraying, particularly when using the second nozzle cap 114 in FIG. 2. In other words, in some constructions the nozzle cap 114 may direct spray to right in FIG. 2, whereas in other embodiments the second nozzle cap 114 may direct spray to the left in FIG. 2. In some constructions, a spraying machine may include a plurality of spray nozzle systems 10, wherein the various adaptors 34 and nozzle caps 82, 114 may be oriented in various angles to accommodate a desired spray pattern to reach weeds or areas of crops and plants, and to increase pesticide or herbicide coverage. Additionally, while only two nozzle caps 82, 114 are illustrated, in other constructions the spray nozzle system 10 includes three or more nozzle caps, each having nozzle outlets that direct liquid at various angles relative to axis 54.

Although the invention has been described in detail with reference to certain preferred embodiments, variations and modifications exist within the scope and spirit of one or more independent aspects of the invention as described.

What is claimed is:

1. A spray nozzle system comprising:
a nozzle body;
an adaptor configured to be coupled to the nozzle body, the adaptor having a first region and a second region angled at a non-zero angle relative to the first region; and
a nozzle cap configured to be coupled to the second region of the adaptor, wherein the nozzle cap includes a first, main body portion that defines an opening at an end of the nozzle cap, and a second body portion that is integrally formed as a single piece with the first body portion, wherein the second body portion includes a nozzle outlet to spray a liquid;
wherein the adaptor is configured to be coupled to the nozzle body along a first axis, and wherein when the nozzle cap is coupled to the adaptor, the nozzle outlet is configured to direct fluid along a second axis that is parallel to the first axis.

2. The spray nozzle system of claim 1, wherein the adaptor includes a first, main body portion and a second body portion that extends from the first, main body portion, the second body portion including the first region and the second region.

3. The spray nozzle system of claim 2, wherein the first, main body portion of the adaptor includes an opening sized and shaped to receive at least a portion of the nozzle body.

4. The spray nozzle system of claim 2, wherein the first, main body portion of the adaptor includes two protruding ribs.

5. The spray nozzle system of claim 2, wherein the nozzle body includes a nozzle body connector lug along a side of the nozzle body, wherein the first, main body portion of the adaptor includes an adaptor connector slot along a side of the first, main body portion, and wherein the nozzle body connector lug is configured to extend into the adaptor connector slot when the nozzle body is coupled to the adaptor.

6. The spray nozzle system of claim 1, wherein the second region of the adaptor includes an adaptor connector lug along a side of the second region, wherein the nozzle cap includes a nozzle cap connector slot, and wherein the adaptor connector lug is configured to extend into the nozzle cap connector slot when the nozzle cap is coupled to the adaptor.

7. The spray nozzle system of claim 1, wherein the first, main body portion of the nozzle cap includes a nozzle cap connector slot and two protruding ribs.

8. The spray nozzle system of claim 1, wherein the angle between the first region of the adapter and the second region of the adapter is between 15°-20°.

* * * * *